(12) United States Patent
Ise et al.

(10) Patent No.: US 11,843,855 B2
(45) Date of Patent: Dec. 12, 2023

(54) ELECTRONIC APPARATUS, CONTROL METHOD, AND NON-TRANSITORY COMPUTER READABLE MEDIUM

(71) Applicant: CANON KABUSHIKI KAISHA, Tokyo (JP)

(72) Inventors: Toshimichi Ise, Kanagawa (JP); Satsuki Tomizawa, Kanagawa (JP); Ippei Uchida, Tokyo (JP); Takashi Hasegawa, Tokyo (JP); Miho Konta, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/872,752

(22) Filed: Jul. 25, 2022

(65) Prior Publication Data

US 2023/0037190 A1    Feb. 2, 2023

(30) Foreign Application Priority Data

Jul. 30, 2021    (JP) ................. 2021-126028

(51) Int. Cl.
*H04N 23/65*    (2023.01)
*H04N 5/77*    (2006.01)
(Continued)

(52) U.S. Cl.
CPC ........... *H04N 23/651* (2023.01); *H04N 5/772* (2013.01); *H04N 23/634* (2023.01); *H04N 23/667* (2023.01)

(58) Field of Classification Search
CPC .... H04N 23/651; H04N 5/772; H04N 23/634; H04N 23/667
See application file for complete search history.

(56) References Cited

U.S. PATENT DOCUMENTS

2005/0231167 A1* 10/2005 Kubota ............. G01R 31/3648
                                                        320/132
2009/0245757 A1* 10/2009 Lin .......................... H04N 5/76
                                                        386/239

(Continued)

FOREIGN PATENT DOCUMENTS

JP    2000-350371 A    12/2000
JP    2005-293519 A    10/2005

(Continued)

*Primary Examiner* — Abdelaaziz Tissire
(74) *Attorney, Agent, or Firm* — Cowan, Liebowitz & Latman, P.C.

(57) ABSTRACT

An electronic apparatus includes: an acquisition unit configured to acquire information on a remaining time representing a remaining usable time of the electronic apparatus; and a control unit configured to perform control to set any of a plurality of modes including a first mode and a second mode having power consumption of the electronic apparatus that is lower than power consumption of the electronic apparatus in the first mode, wherein the control unit performs processing to provide notification to prompt a user to switch from the first mode to the second mode in a case where the remaining time corresponding to the information acquired by the acquisition unit is less than a threshold and a predetermined condition for switching from the first mode to the second mode is satisfied in the first mode.

1 Claim, 11 Drawing Sheets

(51) Int. Cl.
*H04N 23/63* (2023.01)
*H04N 23/667* (2023.01)

(56) References Cited

U.S. PATENT DOCUMENTS

| | | | | |
|---|---|---|---|---|
| 2013/0135509 A1* | 5/2013 | Fuji | ...................... | H04N 23/631 |
| | | | | 348/333.02 |
| 2013/0182178 A1* | 7/2013 | Shioji | .................... | H04N 23/65 |
| | | | | 348/372 |
| 2017/0142339 A1* | 5/2017 | Kim | ....................... | H04N 23/65 |
| 2019/0149743 A1* | 5/2019 | Toyoda | ................ | H04N 23/667 |
| | | | | 348/372 |
| 2023/0032567 A1* | 2/2023 | Konta | ................... | H04N 23/667 |
| 2023/0036096 A1* | 2/2023 | Tomizawa | ............ | H04N 23/634 |

FOREIGN PATENT DOCUMENTS

| | | |
|---|---|---|
| JP | 2008-187234 A | 8/2008 |
| JP | 2016-103748 A | 6/2016 |

\* cited by examiner

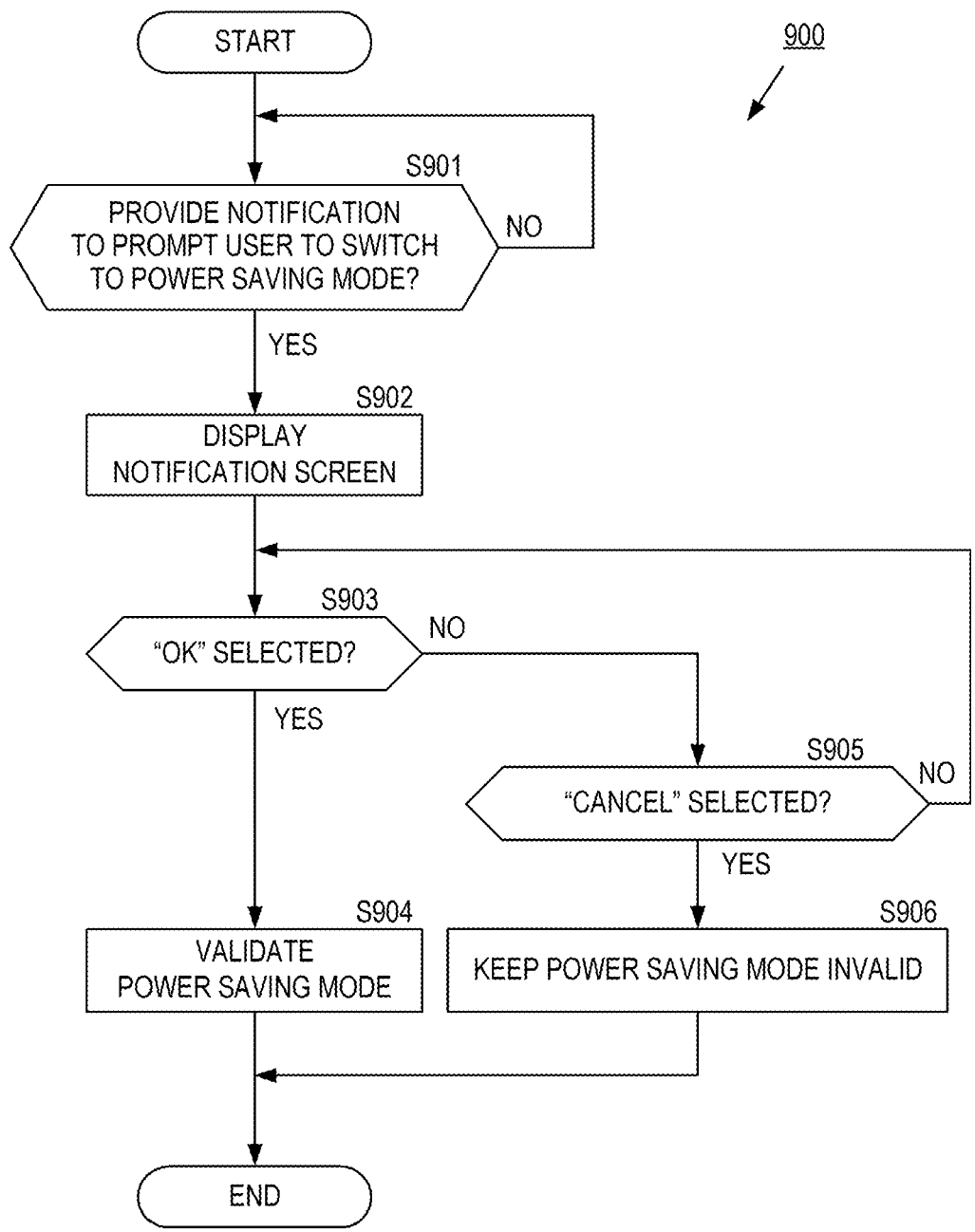

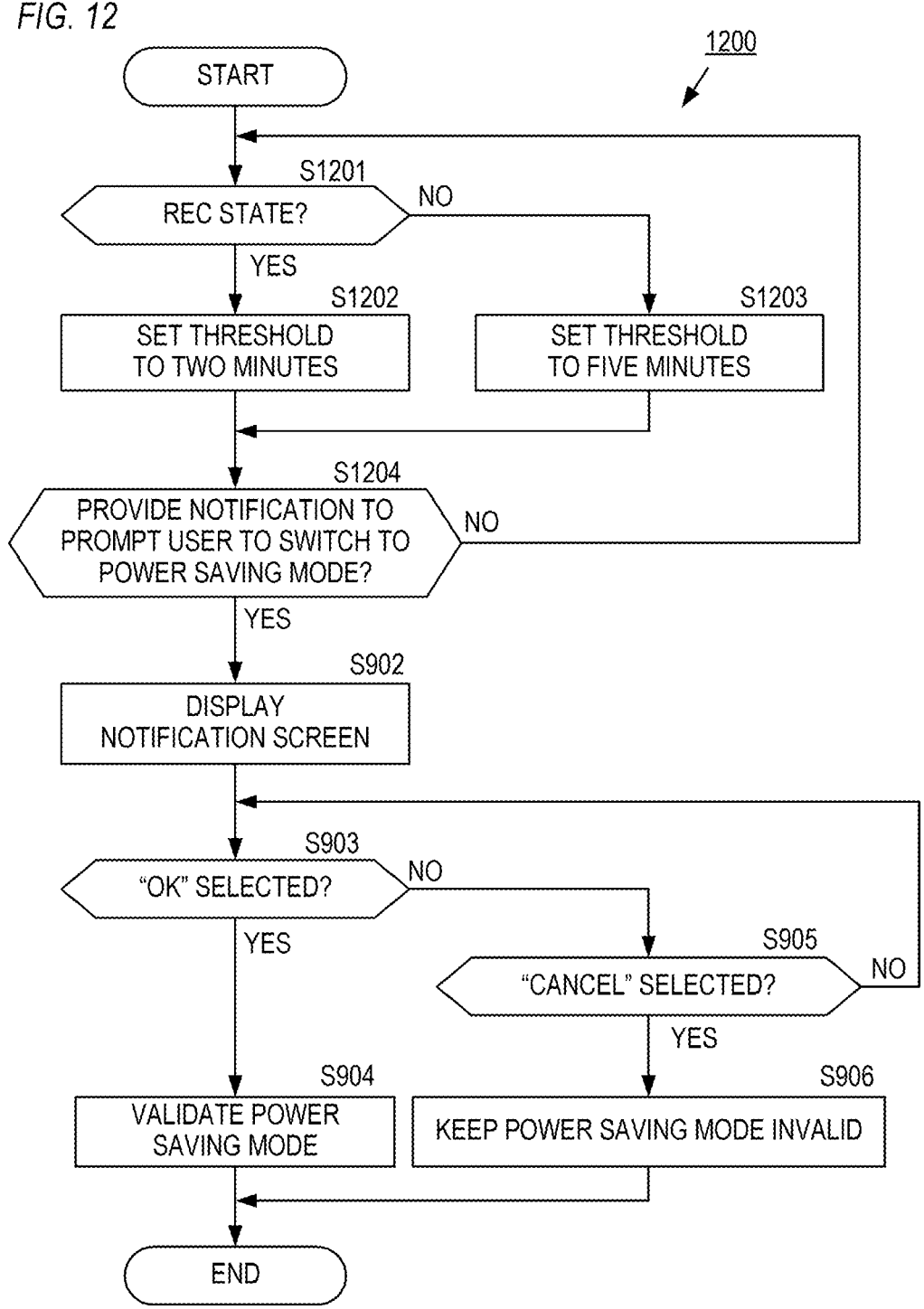

ELECTRONIC APPARATUS, CONTROL METHOD, AND NON-TRANSITORY COMPUTER READABLE MEDIUM

BACKGROUND OF THE INVENTION

Field of the Invention

The present disclosure relates to an electronic apparatus, a control method, and a non-transitory computer readable medium.

Description of the Related Art

Japanese Patent Application Laid-open No. 2008-187234 describes a method for calculating a used power amount corresponding to the use of an electronic apparatus and displaying the number of photographable sheets on the basis of the total capacity of a battery and the used power amount.

Japanese Patent Application Laid-open No. 2005-293519 describes a method for changing an execution function to a function having lower power consumption depending on the priority of respective functions and a battery state.

A user may want to extend a use time when he/she continues to use an electronic apparatus even if the available time of the electronic apparatus is reduced. When functions available in the present operating mode of the electronic apparatus are disabled in another operating mode of the electronic apparatus, the user is allowed to extend the available time by switching the operating mode of the electronic apparatus to the other operating mode. However, even in a state in which the user is allowed to extend the available time of the electronic apparatus by switching the operating mode of the electronic apparatus to the other operating mode, the available time is not extended if the operating mode is not switched.

SUMMARY OF THE INVENTION

The present disclosure has been made in view of the above problem and has an object of extending an available time in a state in which the available time of an electronic apparatus is reduced.

A first aspect of the present disclosure provides an electronic apparatus including at least one processor and at least one memory storing a program which, when executed by the at least one processor, causes the at least one processor to function as: an acquisition unit configured to acquire information on a remaining time representing a remaining usable time of the electronic apparatus; and a control unit configured to perform control to set any of a plurality of modes including a first mode and a second mode having power consumption of the electronic apparatus that is lower than power consumption of the electronic apparatus in the first mode, wherein the control unit performs processing to provide notification to prompt a user to switch from the first mode to the second mode in a case where the remaining time corresponding to the information acquired by the acquisition unit is less than a threshold and a predetermined condition for switching from the first mode to the second mode is satisfied in the first mode.

A second aspect of the present disclosure provides a method for controlling an electronic apparatus including: acquiring information on a remaining time representing a remaining usable time of the electronic apparatus; performing control to set any of a plurality of modes including a first mode and a second mode having power consumption of the electronic apparatus that is lower than power consumption of the electronic apparatus in the first mode; and performing processing to provide notification to prompt a user to switch from the first mode to the second mode in a case where the remaining time corresponding to the information on the remaining time is less than a threshold and a predetermined condition for switching from the first mode to the second mode is satisfied in the first mode.

A third aspect of the present disclosure provides a method for controlling an electronic apparatus comprising: performing control to set any of a plurality of modes including a first mode and a second mode having power consumption of the electronic apparatus that is lower than power consumption of the electronic apparatus in the first mode; and providing notification to prompt a user to switch from the first mode to the second mode in a case where a remaining time representing a remaining usable time of the electronic apparatus becomes less than a threshold in the first mode.

Further features of the present invention will become apparent from the following description of exemplary embodiments with reference to the attached drawings.

BRIEF DESCRIPTION OF THE DRAWINGS

FIG. 9 is a flowchart for describing power saving control processing 900 in the first embodiment;

FIG. 12 is a flowchart for describing power saving control processing 1200 in a second embodiment.

DESCRIPTION OF THE EMBODIMENTS

First Embodiment

Hereinafter, an embodiment of the present disclosure will be described with reference to the drawings. An electronic apparatus according to the present disclosure may only be, for example, an electronic apparatus such as a digital video camera, a digital still camera, a smart phone, and a personal computer that operates with an electrical battery (hereinafter called a battery).

The power consumption of electronic apparatuses such as cameras has been on the increase due to the influence of the addition of new functions or the like. Meanwhile, it has been demanded that the batteries of the cameras be reduced in size and weight and be optimized in development cost. Therefore, newly-developed batteries are not necessarily optimum, and conventional products have been generally used in many cases. When the conventional batteries are used, the maximum power supply of the batteries may fall below the maximum power consumption of the cameras. In order to prevent the maximum power supply of the batteries from falling below the maximum power consumption of the cameras, the minimum operating voltages (reference voltages) of the batteries are increased. The increase in the reference voltages of the batteries leads to an increase in the maximum power supply of the batteries. As a result, it is possible to cover the maximum power consumption of the electronic apparatuses by the power of the batteries.

Figure 3:
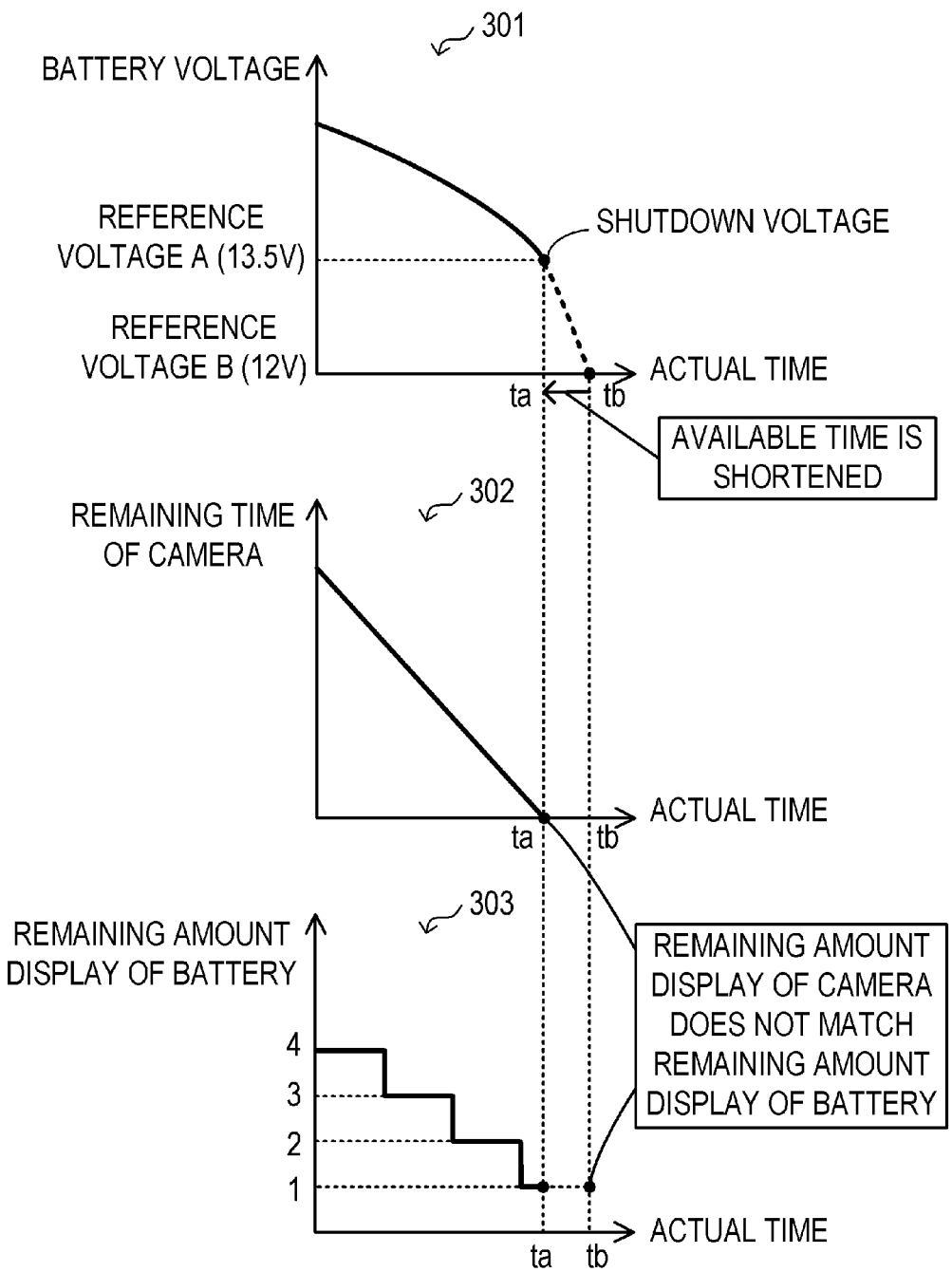
FIG. 3 is a diagram for describing an adverse effect caused when a reference voltage is increased.

Using FIG. 3, the states of a camera and a battery when the reference voltage of the battery that supplies power to the camera is increased will be described. In FIG. 3, a graph 301 is a graph showing a change in a battery voltage relative to the actual operating time (actual time) of the camera. A vertical axis shows the battery voltage, and a horizontal axis shows the actual time. The remaining usable time (hereinafter also called the remaining time) of the camera is calculated so as to become zero when the battery voltage drops to the reference voltage. When the remaining time of the camera becomes zero, the camera ends its driving (shuts down).

When the reference voltage is increased from a reference voltage B (12 V) to a reference voltage A (13.5 V) to cover maximum power consumption, the remaining time of the camera becomes zero when the battery voltage drops to the reference voltage A. Therefore, the remaining time becomes zero at a time ta, and the camera shuts down. With the reference voltage B, the camera shuts down at a time tb. Therefore, when the reference voltage is increased to the reference voltage A, the usable time of the camera is shortened by tb−ta.

In FIG. 3, a graph 302 is a graph showing the duration of usable time (remaining time) of the camera relative to the actual operating time (actual time) of the camera. A vertical axis shows the remaining time of the camera, and a horizontal axis shows the actual time. When the reference voltage of the battery is increased from the reference voltage B to the reference voltage A, the remaining time of the camera is calculated so as to become zero at the time ta.

In FIG. 3, a graph 303 is a graph showing the remaining amount display of the battery relative to the actual operating time (actual time) of the camera. A vertical axis shows the remaining amount display of the battery, and a horizontal axis shows the actual time. The remaining amount of the battery is displayed on a display unit provided in the battery itself in some cases. The remaining amount of the battery is displayed through, for example, a mark, a lamp, an LED display, or the like. In the example of the graph 303, the remaining amount of the battery is displayed at the four levels of 1 to 4.

Even when the reference voltage is increased to the reference voltage A, the remaining amount display of the battery is set on the basis of the time tb at which the battery voltage becomes the reference voltage B. On the other hand, when the reference voltage is increased to the reference voltage A, the remaining time of the camera is calculated on the basis of the reference voltage A. Accordingly, the remaining amount display of the battery does not match the remaining amount display displayed on the camera (the remaining amount display corresponding to the remaining time of the camera).

When the reference voltage of a battery used in an electronic apparatus such as a camera is increased as described in FIG. 3, the shortening of the usable time of the electronic apparatus and the mismatch between the remaining amount display of the battery and the remaining amount display of the electronic apparatus may occur. In the first embodiment, an electronic apparatus switches a calculation method for calculating a remaining time according to power consumption to make it possible to appropriately calculate the remaining time and reduce the mismatch between the remaining amount display of a battery and the remaining amount display of the electronic apparatus.

Figure 1:
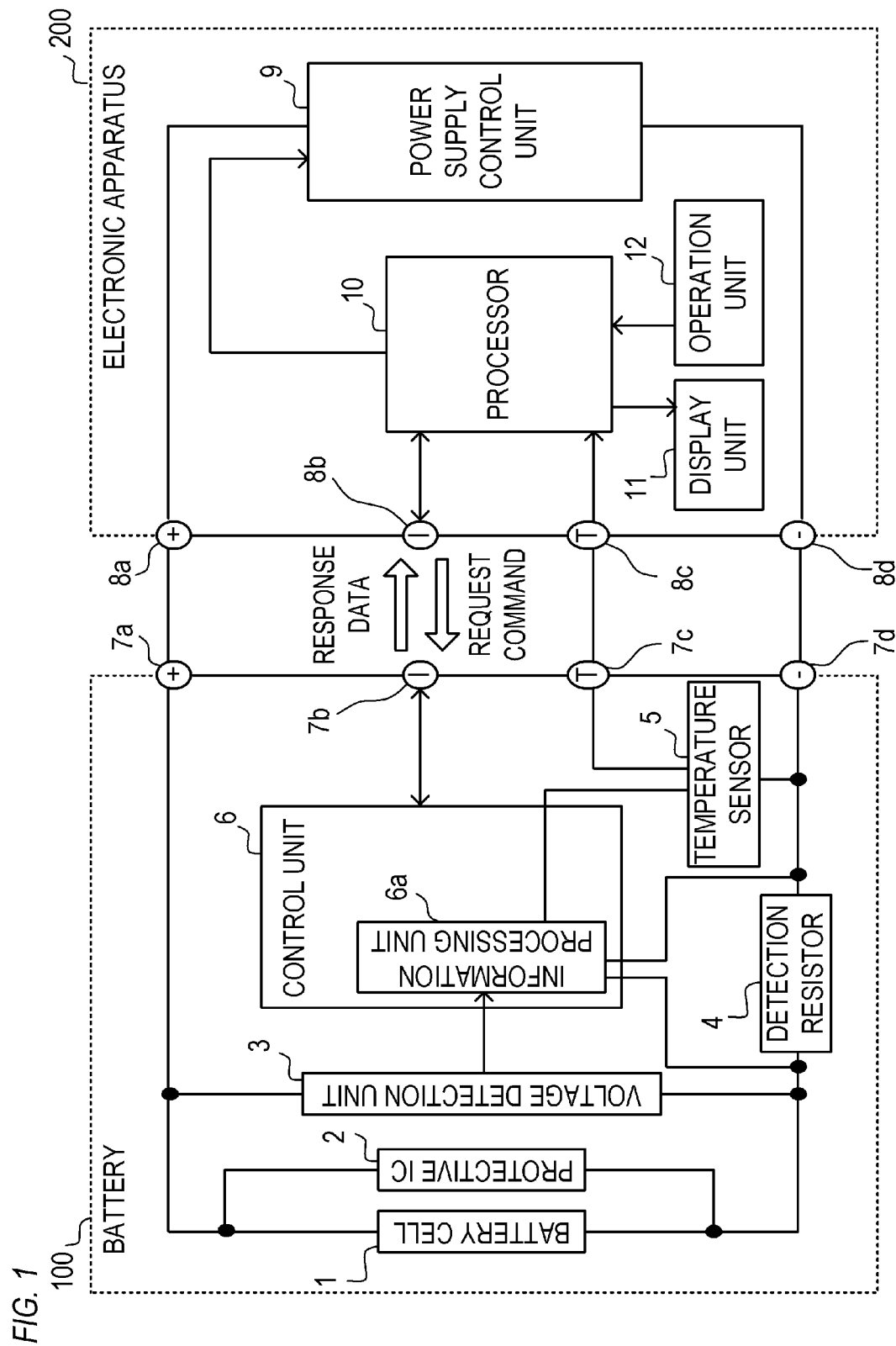
FIG. 1 is a block diagram for describing the configurations of a battery 100 and an electronic apparatus 200 in a first embodiment.

FIG. 1 is a block diagram showing a configuration example of a battery 100 and an electronic apparatus 200 in the first embodiment. The battery 100 and the electronic apparatus 200 are connected to each other when contacts 7a to 7d of the battery 100 are connected to contacts 8a to 8d of the electronic apparatus 200, respectively. The battery 100 supplies power to the electronic apparatus 200 via the contacts 7a, 8a, 7d, and 8d.

Configurations provided in the battery 100 will be described. A battery cell 1 is a charging-type battery cell and generates an electromotive force. A protective IC (Integrated Circuit) 2 is a circuit that controls the protective function of the battery cell 1 during charging and discharging. A voltage detection unit 3 detects a voltage (battery voltage) between the terminals of the battery cell 1. A detection resistor 4 detects a discharging current (battery current). A temperature sensor 5 detects a battery temperature. The temperature sensor 5 is, for example, a thermistor or a thermocouple.

An information processing unit 6a inside a control unit 6 acquires information detected by the voltage detection unit 3, the detection resistor 4, and the temperature sensor 5 and performs the A/D conversion of the acquired information. The information processing unit 6a performs processing to integrate currents since the start of use on the basis of the values of acquired voltages or currents. The battery 100 may be equipped with an LED display unit (not shown) that shows the remaining amount of the battery. The remaining amount display of the battery 100 is controlled by the control unit 6. Besides the remaining amount display of the electronic apparatus 200, the battery 100 is able to display the remaining amount of the battery 100 on the LED display unit.

Configurations provided in the electronic apparatus 200 will be described. A power supply control unit 9 generates a voltage used in the electronic apparatus 200 from a power supply supplied from the battery 100 and supplies power to the constituting elements of the electronic apparatus 200. The power supply control unit 9 is, for example, a circuit including a DC/DC converter or a linear regulator.

A processor 10 controls the respective constituting elements of the electronic apparatus 200. The processor 10 communicates with the battery 100 via the contacts 8b and 7b and transmits a request command to the control unit 6. The processor 10 receives remaining amount information on the battery 100 including a battery remaining amount (remaining capacity), a battery voltage, a battery current, or the like as response data via the contacts 7b and 8b. The processor 10 acquires the remaining usable time of the electronic apparatus 200 using the remaining amount information from the battery 100. Further, the processor 10 receives information on the battery temperature of the battery 100 from the temperature sensor 5 via the contacts 7c and 8c.

A display unit 11 displays information on the electronic apparatus 200 such as a remaining time, moving image data, or the like. The display unit 11 is, for example, a liquid crystal display. An operation unit 12 receives an operation from a user. The operation unit 12 is, for example, a switch or a button and may be a touch panel integrated with the display unit 11. The processor 10 controls the constituting elements of the electronic apparatus 200 according to input information from the operation unit 12.

Figure 2:
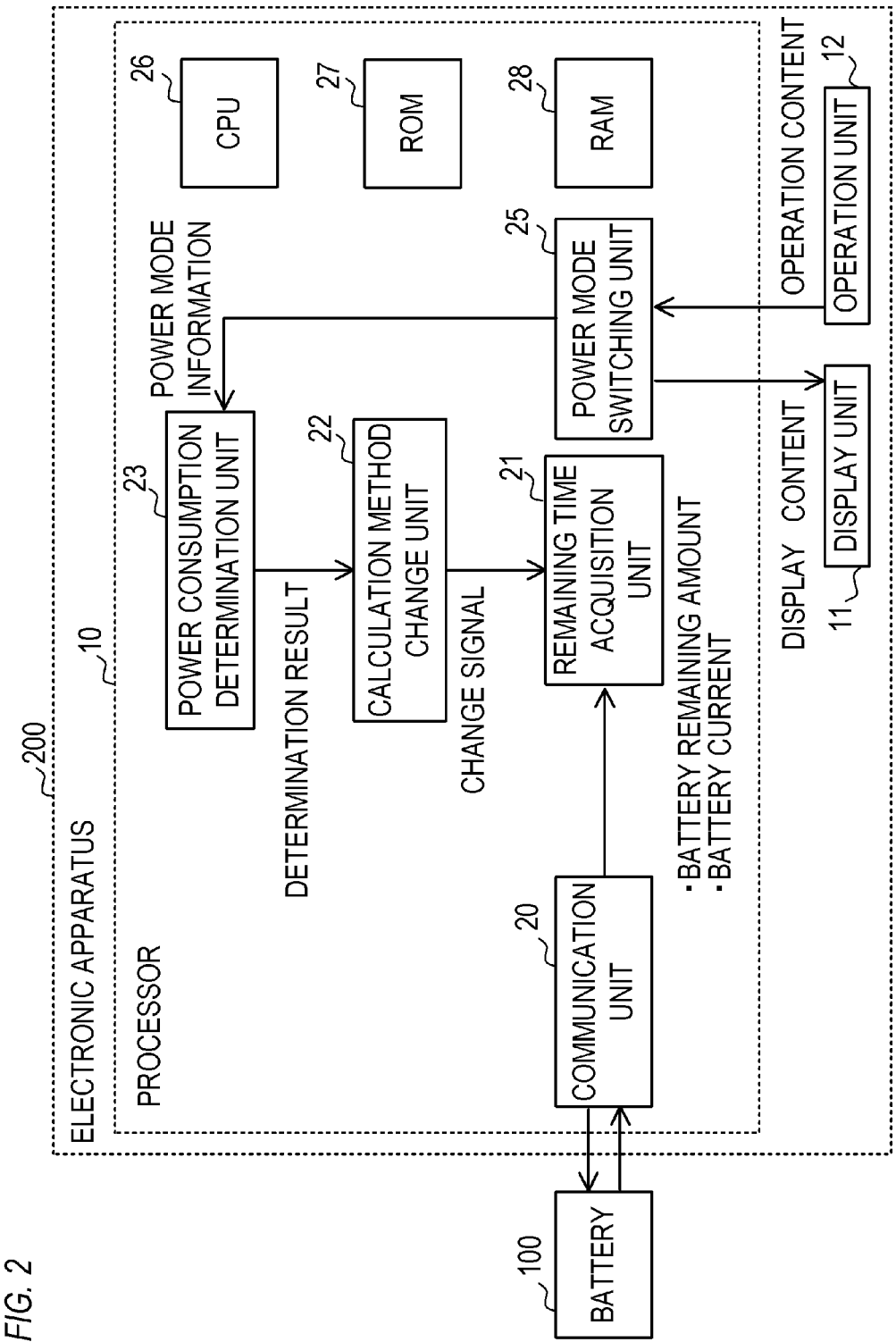
FIG. 2 is a block diagram for describing some of the configurations of the electronic apparatus 200 in the first embodiment.

FIG. 2 is a block diagram showing a configuration example of the electronic apparatus 200 in the first embodiment. FIG. 2 is a diagram describing in detail the processor 10 among the respective configurations of the electronic apparatus 200 shown in FIG. 1. A CPU 26 provided in the processor 10 is responsible for controlling the respective blocks of the processor 10 via a bus not shown. A ROM 27 stores a program that is executed by the CPU 26. A partial area of the ROM 27 is used as a backup to maintain the state of the electronic apparatus 200 or the like. A RAM 28 is a volatile memory that is used as temporary storage of the CPU 26.

The CPU 26 executes a program that is read from the ROM 27 or a recording medium serving as a non-volatile memory into the RAM 28 to cause the electronic apparatus 200 to realize the functions of a communication unit 20, a remaining time acquisition unit 21, a calculation method change unit 22, a power consumption determination unit 23, and a power mode switching unit 25. Further, the CPU 26 performs control so that the electronic apparatus 200 ends its operation when the remaining time of the electronic apparatus 200 becomes zero. The communication unit 20 receives remaining amount information on the battery 100 including a battery remaining amount and a battery current through communication with the battery 100.

The remaining time acquisition unit 21 acquires the remaining time of the electronic apparatus 200 on the basis of information on a battery remaining amount and information on a battery current that are acquired from the battery 100. A calculation method for calculating the remaining time by the remaining time acquisition unit 21 is determined on the basis of information from the calculation method change unit 22. The acquired remaining time of the electronic apparatus 200 is output to and displayed on the display unit 11 via a signal line.

The calculation method change unit 22 determines a calculation method for calculating a remaining time on the basis of the determination result of the power consumption of the electronic apparatus 200 that is output from the power consumption determination unit 23. The calculation method change unit 22 outputs information on the determined calculation method for calculating the remaining time to the remaining time acquisition unit 21.

The power consumption determination unit 23 determines the power consumption of the electronic apparatus 200. The power consumption determination unit 23 is able to determine the power consumption on the basis of power mode information from the power mode switching unit 25. The electronic apparatus 200 has a plurality of power modes having different maximum power consumption. Since available functions are different between the respective power modes, the maximum power consumption in the respective power modes is acquired on the basis of the functions available in the respective modes. The power consumption determination unit 23 outputs the determination result of the power consumption of the electronic apparatus 200 to the calculation method change unit 22.

Note that the power consumption determination unit 23 may determine the power modes according to other methods. For example, the power consumption determination unit 23 calculates the power consumption of the electronic apparatus 200 from the product of a battery voltage and a battery current that are acquired from the battery 100 via the communication unit 20. Then, the power consumption determination unit 23 may compare the calculated power consumption with a power consumption table stored in advance in the ROM 27 to determine a present power mode. Note that the power consumption table is a table showing the corresponding relationship between the power consumption and the power modes of the electronic apparatus 200.

The power mode switching unit 25 receives a signal showing an operation content for switching a power mode from the operation unit 12 and switches the power mode on the basis of the received signal. For example, when the display unit 11 displays the respective power modes of the electronic apparatus 200 and a user selects a desired power mode via the operation unit 12, an operation content is transmitted to the power mode switching unit 25. The power mode switching unit 25 switches a power mode on the basis of a user's operation and outputs information on a switched power mode to the power consumption determination unit 23.

Note that the display unit 11 may display, instead of respective power mode names, a user interface for causing the user to select the ON and OFF of a power saving mode. When the power saving mode is set to be turned ON from OFF by the user, the power mode switching unit 25 outputs information showing that a switched power mode is the power saving mode to the power consumption determination unit 23.

Figure 4:
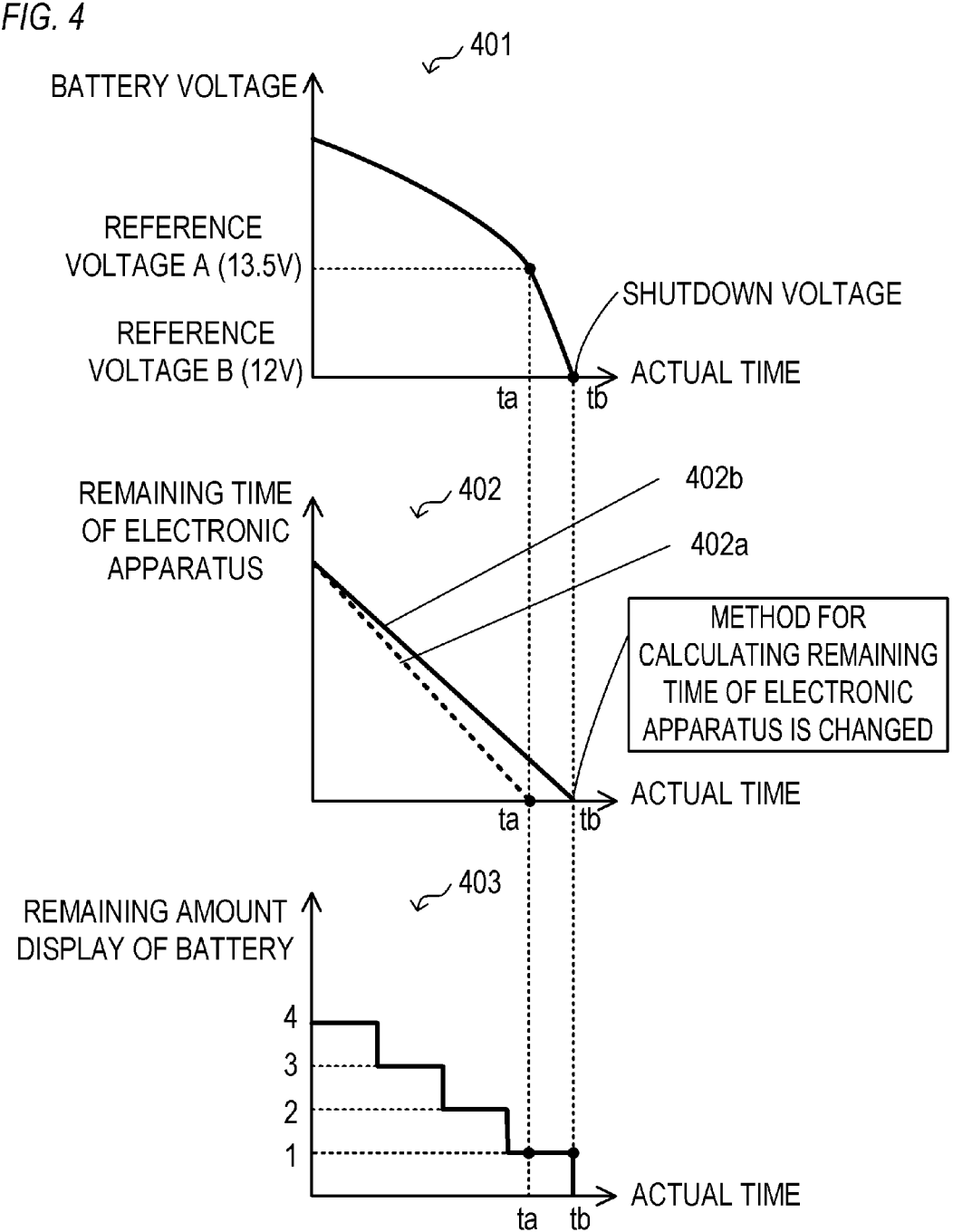
FIG. 4 is a diagram for describing a method for switching a calculation formula for the remaining amount display of the electronic apparatus 200 in the first embodiment.

A change in the calculation method for calculating the remaining time of the electronic apparatus 200 will be described with reference to FIG. 4. In FIG. 4, a graph 401 is a graph showing a change in a battery voltage relative to the actual operating time (actual time) of the electronic apparatus 200. A vertical axis shows the battery voltage, and a horizontal axis shows the actual time.

When a reference voltage is increased to a reference voltage A (13.5 V) along with an increase in power consumption, the actual time of the electronic apparatus 200 is shortened to to as shown in FIG. 3. In the power saving mode, the electronic apparatus 200 restricts available functions to reduce its power consumption. The reduction in the power consumption of the electronic apparatus 200 allows a reduction in the reference voltage of the electronic apparatus 200. In the power saving mode, the electronic apparatus 200 sets the reference voltage at a reference voltage B (12 V) to comply with the power saving mode and determines the calculation method for calculating the remaining time as follows. Accordingly, the remaining time is calculated so as to become zero when the battery voltage drops to the reference voltage B, and the electronic apparatus 200 is allowed to delay its shutdown until the actual time becomes tb.

The electronic apparatus 200 has a plurality of power mode having different maximum power consumption and is allowed to change the reference voltage according to the power consumption of the respective power modes. The maximum power consumption of the respective power modes is different depending on functions available in the respective power modes. The power modes of the electronic apparatus 200 include, for example, a normal mode and the power saving mode having maximum power consumption smaller than that of the normal mode. The power saving mode refers to an operating state in which the available functions are restricted to reduce the maximum power consumption of the electronic apparatus 200 in comparison with the normal mode. A user is only required to turn on the power saving mode when he/she wants to increase the remaining time of the electronic apparatus 200. The normal mode corresponds to a "first mode," and the power saving mode corresponds to a "second mode".

In the power saving mode, some of the functions of the electronic apparatus 200 are disabled. In the power saving mode, at least one of the functions available in the normal mode may be disabled. For example, the electronic apparatus 200 disables functions such as the high brightness setting of the backlight of the display unit and a network function in the power saving mode. Further, the processing contents of the respective functions of the electronic apparatus 200 may be changed to reduce the processing load of the processor 10 in the power saving mode. When the electronic apparatus 200 operates in the normal mode, the user is allowed to increase the remaining time of the electronic apparatus 200 by turning on the power saving mode.

The calculation method for calculating the usable time (remaining time) of the electronic apparatus 200 will be described with reference to a graph 402 in FIG. 4. The graph 402 is a graph showing the remaining time of the electronic apparatus 200 relative to the actual operating time (actual time) of the electronic apparatus 200. A vertical axis shows the remaining time of the electronic apparatus 200, and a horizontal axis shows the actual time. The electronic apparatus 200 changes the calculation method according to a present power mode to calculate the remaining time of the electronic apparatus 200.

The power consumption determination unit 23 determines the maximum power consumption of the electronic apparatus 200 in a present power mode on the basis of power mode information received from the power mode switching unit 25. The calculation method change unit 22 determines the calculation method for calculating the remaining time of the electronic apparatus 200 on the basis of the determination result of the power consumption determination unit 23.

The calculation method change unit 22 determines a coefficient (hereinafter called a correction coefficient) used to calculate the remaining time of the electronic apparatus 200 according to power consumption in the present power mode. The correction coefficient is a coefficient used to correct the remaining time so that the remaining time of the electronic apparatus 200 becomes zero when the voltage of the battery 100 drops to a reference voltage. By the determination of the correction coefficient based on the present power mode of the electronic apparatus 200, the remaining time before the voltage of the battery 100 drops to the reference voltage corresponding to the present power mode is acquired. The calculation method change unit 22 is allowed to output information showing the determined correction coefficient to, for example, the remaining time acquisition unit 21.

When the correction coefficient in the normal mode is k1 and the correction coefficient in the power saving mode is k2, the remaining time acquisition unit 21 is able to calculate the remaining time of the electronic apparatus 200 according to the following Formulae (Formula 1) and (Formula 2).

$$T = \{C \times k1 / I\} \times 60 \quad \text{(Formula 1)}$$

$$T = \{C \times k2 / I\} \times 60 \quad \text{(Formula 2)}$$

T represents the remaining time [minute] of the electronic apparatus 200. C represents a battery remaining amount [mAh]. I represents a battery current [mA]. The battery remaining amount and the battery current are acquired from the battery 100 as remaining amount information.

As described above, the reference voltage corresponding to the normal mode is set according to the maximum power consumption in the normal mode, and the reference voltage corresponding to the power saving mode is set according to the maximum power consumption in the power saving mode. Further, the value of the correction coefficient k1 is a value considering the reference voltage corresponding to the normal mode, and the value of the correction coefficient k2 is a value considering the reference voltage corresponding to the power saving mode.

In a graph 402, a graph 402a shown by dotted lines is a graph of the remaining time when the correction coefficient k1 is used, and the remaining time becomes zero at an actual time ta. A graph 402b shown by a solid line is a graph of the remaining time when the correction coefficient k2 is used, and the remaining time becomes zero at an actual time tb.

In FIG. 4, a graph 403 is a graph showing the remaining amount display of the battery relative to the actual operating time (actual time) of the electronic apparatus 200 like the graph 303 in FIG. 3. A vertical axis shows the remaining amount display of the battery, and a horizontal axis shows the actual time. Since the electronic apparatus 200 changes the calculation method to (Formula 2) in the power saving mode, the remaining time becomes zero at the actual time tb as shown in the graph 402b. Accordingly, the mismatch between the remaining amount display of the battery and the remaining amount display of the electronic apparatus 200 is solved.

As described above, the correction coefficients used to calculate the remaining times are switched according to the power modes, whereby the remaining times adapted to the reference voltages corresponding to the power modes are calculated. Therefore, the electronic apparatus 200 is able to increase its remaining time in a power mode having small power consumption. Further, it is possible to make the display of the remaining time displayed on the electronic apparatus 200 match the display of the remaining amount of the battery 100.

Note that the number of the power modes of the electronic apparatus 200 is not limited to two but may be at least three. In the case of at least three power modes, the electronic apparatus 200 is allowed to acquire a remaining time corresponding to power consumption by changing a correction coefficient for each of the modes. Further, the values of the reference voltages corresponding to the respective power modes are given as an example and are only required to be set on the basis of power consumption in the respective power modes. Further, the power consumption in the respective power modes may be maximum power consumption in the power modes. Further, the correction coefficients are not necessarily changed on the basis of a present power mode but may be changed on the basis of the present power consumption of the electronic apparatus 200.

The electronic apparatus 200 is allowed to suppress the shortening of the usable time of the electronic apparatus 200 by changing the calculation method for calculating the remaining time of the electronic apparatus 200 according to the power modes or power consumption. Further, it is possible to reduce the mismatch between the remaining amount display of the battery and the remaining amount display of the electronic apparatus.

Even in a state in which it is possible to increase a remaining time by switching the power mode (operating mode) of the electronic apparatus 200 from the normal mode to the power saving mode, the remaining time is not extended if the power mode is not switched. In view of this, notification to prompt the user to switch to a power mode with which an available time is extendable is provided when the available time of the electronic apparatus 200 is reduced in the first embodiment. By the notification, the user is allowed to recognize that the available time is extendable by switching a power mode.

Figure 10A:
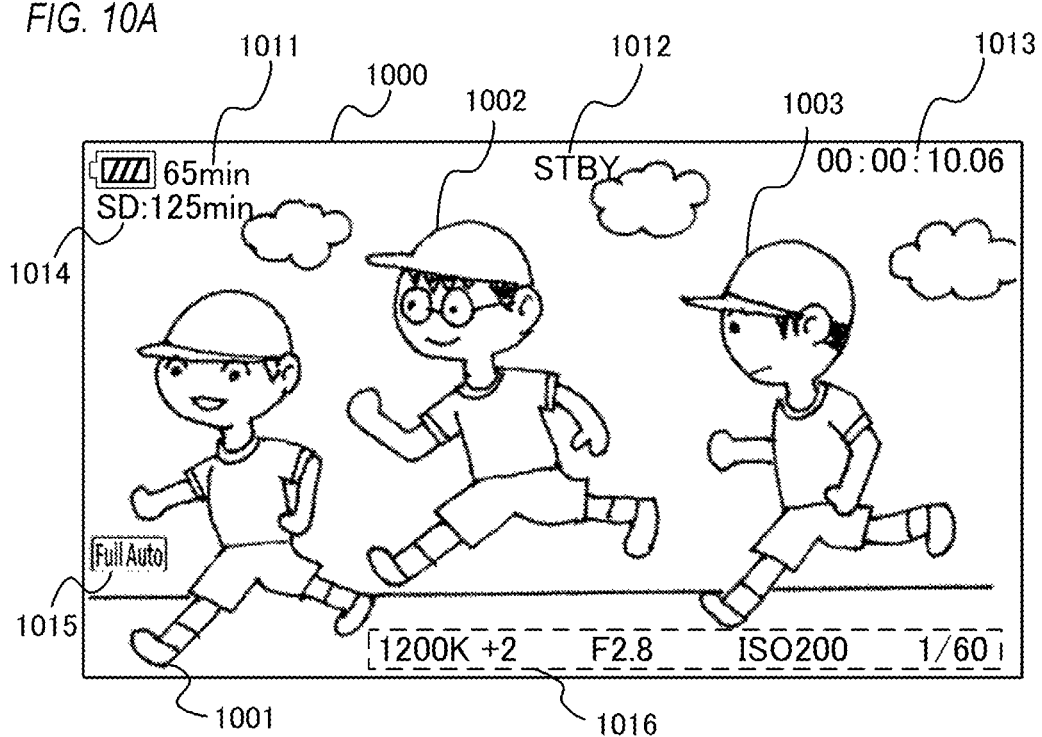
FIGS. 10A and 10B are diagrams for describing an example of a notification screen.
Figure 10B:
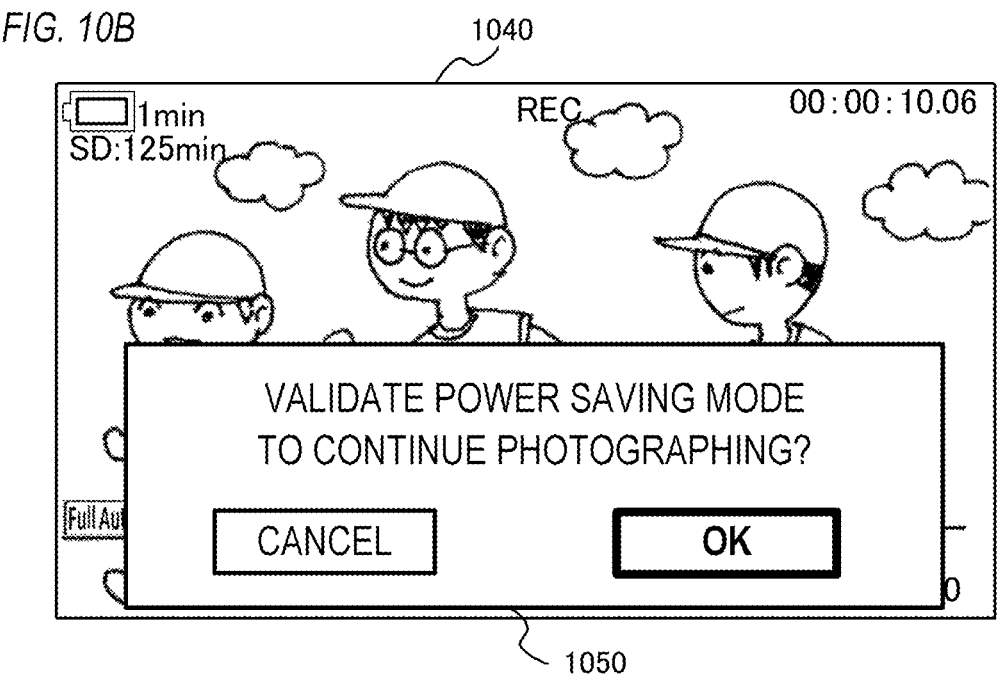
Figure 11:
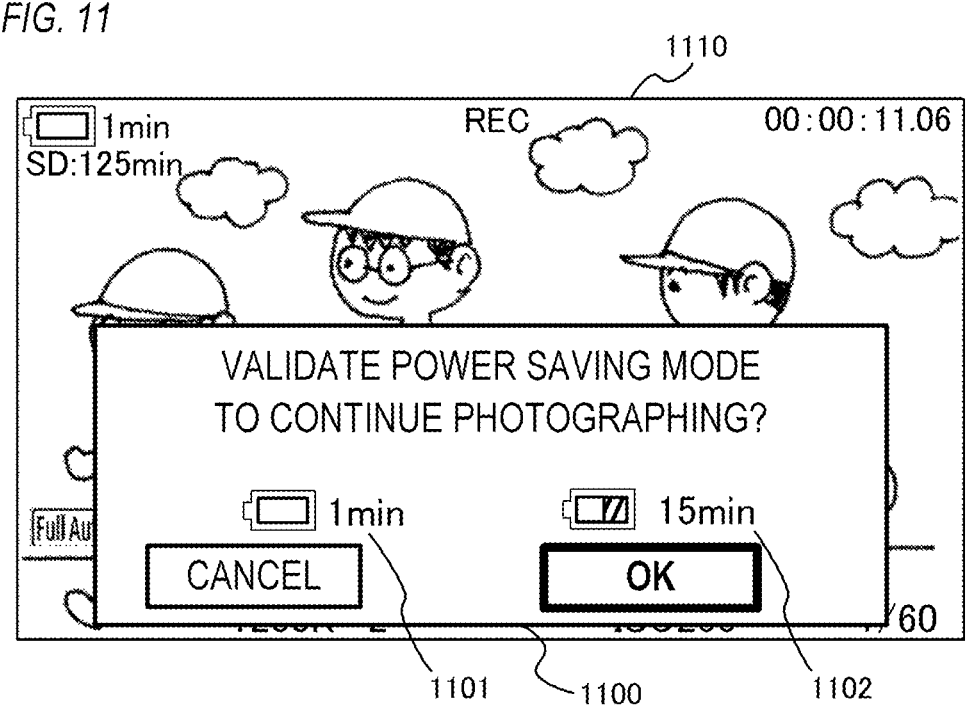
FIG. 11 is a diagram for describing an example of the notification screen.

With reference to FIGS. 9 to 11, processing to provide notification to prompt the user to switch from the normal mode (first mode) to the power saving mode (second mode) will be described. FIG. 9 is a flowchart for describing power saving control processing 900 performed by the electronic apparatus 200. The electronic apparatus 200 allows the user to select the validity/invalidity of the power saving mode by performing the power saving control processing 900. The power saving control processing 900 starts when the power supply of the electronic apparatus 200 is turned on.

In step S901, the CPU 26 determines whether to provide notification to prompt the user to switch to the power saving mode. The CPU 26 determines that the notification to prompt the user to switch to the power saving mode is not provided when the power saving mode is not invalid, that is, when the electronic apparatus 200 has been set to the power saving mode. Further, the CPU 26 determines that the notification to prompt the user to switch to the power saving mode is not provided when a remaining time in a present operating mode (power mode) is at least a threshold even in a case in which the power saving mode is invalid. Further, the CPU 26 determines that the notification to prompt the user to switch to the power saving mode is not provided when a switching condition (a predetermined condition) for switching from the normal mode to the power saving mode is not satisfied even in a case in which the power saving mode is invalid and a remaining time in a present operating mode is less than a threshold. As described above, the CPU 26 determines that the notification to prompt the user to switch to the power saving mode is provided when the power saving mode is invalid, a remaining time is less than a threshold, and the switching condition for switching from the normal mode to the power saving mode is satisfied. The CPU 26 proceeds to step S902 when determining that the notification to prompt the user to switch to the power saving mode is provided. The CPU 26 continues the determination of step S901 until the notification condition is satisfied when determining that the notification is not provided.

The CPU 26 may determine the invalidity of the power saving mode on the basis of the setting state of a present power mode. Further, the CPU 26 may determine the invalidity of the power saving mode on the basis of power consumption determined by the power consumption determination unit 23. For example, when the present power consumption of the electronic apparatus 200 is higher than the maximum power consumption of the power saving mode, the CPU 26 may determine that the power saving mode is invalid. When the present power consumption of the CPU 200 is not more than the maximum power consumption of the power saving mode, the CPU 26 may determine that the power saving mode is valid.

The CPU 26 determines whether the switching condition for switching from the normal mode to the power saving mode is satisfied depending on whether a function exclusive to (unavailable in) the power saving mode is valid. For example, when a network function and the function of high brightness settings of the display unit 11 such as an LCD are unavailable in the power saving mode, the CPU 26 determines that the switching condition is not satisfied if any of the network function and the function of high brightness settings of an LCD is valid. On the other hand, the CPU 26 determines that the switching condition is satisfied if both the network function and the function of high brightness settings of an LCD are invalid.

Note that although the network function and the function of high brightness settings of an LCD are predetermined functions available in the normal mode but unavailable in the power saving mode in the first embodiment, other functions such as a function relating to image processing may be used instead. The functions available in the normal mode but unavailable in the power saving mode may be registered in advance in the ROM 27 or the like, or may be set by the user.

The CPU 26 determines whether a remaining time is at least a threshold on the basis of a remaining time acquired by the remaining time acquisition unit 21. The threshold of a remaining time may be, for example, one minute. In this case, the CPU 26 determines that the remaining time is less than the threshold when the remaining time acquired by the remaining time acquisition unit 21 is less than one minute. Note that the threshold of a remaining time is not limited to one minute but may be set to be longer/shorter than one minute. The threshold of a remaining time may be a value registered in advance in the ROM 27 or the like, or may be a value set by the user.

In step S902, the CPU 26 displays a notification screen (area) for prompting the user to switch to the power saving mode. That is, the CPU 26 provides notification to prompt the user to change settings to validate the power saving mode to the user. Here, the notification to the user in the first embodiment will be described with reference to FIGS. 10A and 10B. FIG. 10A is a diagram showing an image display example displayed on the display unit 11 during photographing.

In a photographing screen 1000 in FIG. 10A, subjects 1001, 1002, and 1003 are included. The CPU 26 develops image data including the subjects 1001 to 1003 captured by an imaging unit provided in the electronic apparatus 200 into the RAM 28 and displays the same on the display unit 11.

On the photographing screen 1000, a remaining time 1011, a recording status 1012, a photographing time code 1013, an SD card recordable time 1014, a camera mode icon 1015, and a photographing parameter 1016 are displayed through an OSD (On-Screen Display). The data displayed through the OSD is developed into the RAM 28. The CPU 26 superimposes various data onto image data acquired from the imaging unit through the function of the OSD to display the photographing screen 1000 on the display unit 11.

The display unit 11 is, for example, a liquid crystal display. The operation unit 12 is, for example, a switch, a button, or a cross key and may be a touch panel configured to be integrated with the display unit 11. In the first embodiment, a screen display example in a case in which the electronic apparatus 200 is a video camera is shown. However, the electronic apparatus 200 is not limited to a video camera but may include a reproduction apparatus or other electronic apparatuses.

FIG. 10B is a display example of a notification screen 1040 for prompting the user to change settings to validate the power saving mode. On the notification screen 1040 in FIG. 10B, a confirmation message 1050 for prompting the user to validate the power saving mode is displayed on the OSD so as to be superimposed onto the photographing screen 1000 shown in FIG. 10A through the function of the OSD. When the notification screen 1040 is displayed in step S902, the user is allowed to recognize that the remaining time of the electronic apparatus 200 is increased by the setting of the power saving mode and photographing by the electronic apparatus 200 is continued. Further, the user is allowed to select the validity/invalidity of the power saving mode using the notification screen 1040.

In step S903, the CPU 26 determines a selecting operation having been received from the user. The CPU 26 proceeds to the processing of step S904 when having received the selecting operating of "OK" from the user. Otherwise, the CPU 26 proceeds to the processing of step S905. Note that the selecting operation having been received from the user refers to an operation having been performed by the user through the operation unit 12. For example, when the operation unit 12 is a cross key, the user is able to select "OK" or "Cancel" by an operation in a right-left direction. The CPU 26 displays a cursor to show which one of "OK" and "Cancel" is valid on the screen when the operation unit 12 is operated in the right-left direction. The confirmation message 1050 in FIG. 10B shows a state in which a cursor has been displayed on "OK." When the user performs an operation to press the center of the cross key in a state in which the cursor has been displayed on "OK," the CPU 26 determines that "OK" has been selected. Note that the operation unit 12 is a cross key in the first embodiment. However, the operation unit 12 is only required to be one that allows the selection of "OK" or "Cancel," and may be a touch panel or an operating button.

In step S904, the CPU 26 validates the power saving mode. Further, the CPU 26 hides the confirmation message 1050 and displays the photographing screen 1000.

In step S905, the CPU 26 determines whether the selecting operation of "Cancel" has been received from the user. The CPU 26 proceeds to the processing of step S906 when the operation of "Cancel" has been received from the user. Otherwise, the CPU 26 proceeds to the processing of step S903.

In step S906, the CPU 26 keeps the power saving mode invalid. Further, the CPU 26 hides the confirmation message 1050 and displays the photographing screen 1000.

Note that the condition for determining whether to provide the notification in step S901 described above is not limited to the exemplified one but may employ different conditions. For example, when the power saving mode is invalid and a remaining time is less than a threshold, the CPU 26 may provide notification to prompt the user to switch to the power saving mode regardless of whether functions available in the normal mode but unavailable in the power saving mode are being used. Then, when the user performs an operation to validate the power saving mode after the notification in a case in which the functions available in the normal mode but unavailable in the power saving mode are being used, the CPU 26 may stop the functions available in the normal mode but unavailable in the power saving mode. Further, when a power mode is switched to the power saving mode, the CPU 26 may provide notification to prompt the user to switch to the power saving mode while notifying the user of the fact that the functions available in the normal mode but unavailable in the power saving mode will be disabled. As described above, even in a case in which functions available in the normal mode but unavailable in the power saving mode are being used, the CPU 26 prompts the user to change settings to switch to the power saving mode. As a result, the user is allowed to extend the remaining time of the electronic apparatus 200.

Further, the above description shows an example in which the confirmation message 1050 is displayed on the notification screen 1040 displayed in step S902, but displayed information is not limited to the example. For example, as shown in FIG. 11, the CPU 26 may display information on the respective remaining times of the normal mode and the power saving mode together on the notification screen 1110. In the example of FIG. 11, the CPU 26 displays a present remaining time 1101 acquired by the remaining time acquisition unit 21 and a remaining time 1102 after switching to the power saving mode on a confirmation message 1100 for confirming whether to switch to the power saving mode. The remaining time of the normal mode and the remaining time of the power saving mode may be calculated using the calculation formulae described above. Further, the remaining time of the normal mode and the remaining time of the power saving mode may be calculated from a battery remaining amount or a battery voltage acquired from the battery 100. Through the display of the remaining time of the normal mode and the remaining time of the power saving mode, the user is allowed to more definitely confirm an effect obtained by invalidating the power saving mode. Note that the CPU 26 may display on the notification screen 1110 both the remaining times and battery icons as shown in FIG. 11 or may display only the remaining times. Further, the CPU 26 may display on the notification screen 1110 an extended time obtained by switching to the power saving mode.

In the first embodiment, the CPU 26 displays a notification screen when the remaining time of the electronic apparatus 200 is less than a threshold. The user is allowed to switch the power mode of the electronic apparatus 200 to the power saving mode and extend the remaining time by performing an operation to validate the power saving mode. Further, in the method of the first embodiment, the user is allowed to switch to the power saving mode without an operation to display a setting screen for a power mode and switch to the power saving mode. Accordingly, the method of the first embodiment has high convenience for the user who feels troublesome at changing settings such as switching of a power mode. Further, in the method of the first embodiment, the user is allowed to extend a remaining time by switching to the power saving mode depending on a displayed notification screen without grasping the functions of the power saving mode in advance.

Note that when determining that the notification to prompt the user to switch to the power saving mode is provided in step S901, the electronic apparatus 200 may automatically switch to the power saving mode without providing the notification to the user. The user is allowed to extend the remaining time without switching the power mode by himself/herself.

Second Embodiment

In a second embodiment, the apparatus configuration of an electronic apparatus 200 is the same as that of the first embodiment, but processing to change the content and timing of notification to prompt a user to switch to a power saving mode depending on an image capturing state is different from that of the first embodiment. The electronic apparatus 200 is able to provide setting means having higher convenience by changing a control content depending on an image capturing state. Hereinafter, with reference to FIG.

12, the flowchart of power saving control processing will be described along with its difference between the first and second embodiments.

FIG. 12 is a flowchart for describing power saving control processing 1200 performed by the electronic apparatus 200. The power saving control processing 1200 starts when the power supply of the electronic apparatus 200 is turned on.

In step S1201, a CPU 26 determines the image capturing state of the electronic apparatus 200. The image capturing state of the electronic apparatus 200 includes a REC state (recording state) and a non-REC state. The REC state refers to a state in which the electronic apparatus 200 captures a subject and records a captured image. The non-REC state refers to, for example, a standby state in which the electronic apparatus 200 is allowed to perform photographing, a power-on state, or the like. The CPU 26 proceeds to the processing of step S1202 when the electronic apparatus 200 is in a REC state. Otherwise, the CPU 26 proceeds to the processing of step S1203.

In step S1202, the CPU 26 sets the threshold of a remaining time that is used to determine whether to provide notification to prompt the user to switch to the power saving mode to two minutes (first threshold) and proceeds to the processing of step S1204.

In step S1203, the CPU 26 sets the threshold of the remaining time that is used to determine whether to provide the notification to prompt the user to switch to the power saving mode to five minutes (second threshold) and proceeds to the processing of step S1204. Note that the values of the thresholds set in steps S1202 and S1203 are given only as an example and the thresholds are not limited to the values.

In the second embodiment, the CPU 26 sets the threshold of a remaining time to a different value depending on the determination of an image capturing state in step S1201 unlike the first embodiment. For example, the CPU 26 may set the threshold to two minutes when the electronic apparatus 200 is in a REC state. That is, the CPU 26 may set the threshold to be shorter than a threshold used when the electronic apparatus 200 is in a non-REC state, i.e., five minutes. When the electronic apparatus 200 is in the REC state, a confirmation message 1050 is displayed on a notification screen 1040 or a confirmation message 1100 is displayed on a notification screen 1110, which may interrupt a part of a photographing screen 1000 and reduce visibility thereof. Further, when the electronic apparatus 200 switches to the power saving mode and stops the function of high brightness settings, the visibility of the photographing screen 1000 may also reduce. Accordingly, when the electronic apparatus 200 is in a REC state, the CPU 26 reduces the threshold of a remaining time for displaying a notification screen in order to perform photographing for a long period of time with excellent visibility. Since the notification screen is not displayed until the remaining time of the electronic apparatus 200 is close to the end, the user is allowed to use the electronic apparatus 200 while keep visibility for a longer period of time. On the other hand, when the electronic apparatus 200 is in a non-REC state, the CPU 26 performs control so that a notification screen is displayed at an earlier time point than the case of the REC state. Since the notification screen is displayed at a timing at which the remaining time reduces to some extent, the user is allowed to switch to the power saving mode with a time allowance.

Note that the threshold of a remaining time is not limited to two minutes or five minutes but other values may be set. Further, for example, when the user wants to perform photographing for a longer period of time even if visibility reduces, he/she may set a threshold that is used when the electronic apparatus 200 is in a REC state to be longer than a threshold that is used when the electronic apparatus 200 is in a non-REC state.

In step S1204, the CPU 26 determines whether to provide the notification to prompt the user to switch to the power saving mode. The CPU 26 determines that the notification to prompt the user to switch to the power saving mode is not provided when the power saving mode is not invalid, that is, when the electronic apparatus 200 has been set to the power saving mode. Further, the CPU 26 determines that the notification to prompt the user to switch to the power saving mode is not provided when a remaining time in a present operating mode (power mode) is at least a threshold even in a case in which the power saving mode is invalid. Further, the CPU 26 determines that the notification to prompt the user to switch to the power saving mode is not provided when the switching condition for switching from a normal mode to the power saving mode is not satisfied even in a case in which the power saving mode is invalid and a remaining time in a present operating mode is less than a threshold. As described above, the CPU 26 determines that the notification to prompt the user to switch to the power saving mode is provided when the power saving mode is invalid, a remaining time is less than a threshold, and the switching condition for switching from the normal mode to the power saving mode is satisfied. The CPU 26 proceeds to step S902 when determining that the notification to prompt the user to switch to the power saving mode is provided. When determining that the notification is not provided, the CPU 26 returns to step S1201 and repeatedly performs the processing of steps S1201 to S1204. As described above, the CPU 26 sets the threshold of a remaining time that is used in the determination of step S1204 depending on the image capturing state of the electronic apparatus 200.

Note that in the embodiment described above, the CPU 26 determines whether to provide the notification to prompt the user to switch to the power saving mode is provided using information on the remaining time of the electronic apparatus 200. Besides this, the CPU 26 may use a battery voltage or a battery remaining amount. That is, the CPU 26 may determine that the notification to prompt the user to switch to the power saving mode is provided when the power saving mode is set to be invalid, a battery voltage is less than a threshold, and the switching condition for switching from the normal mode to the power saving mode is satisfied. Further, the CPU 26 may acquire a remaining time on the basis of a battery voltage or a battery remaining amount.

In addition, the switching condition for switching from the normal mode to the power saving mode may be a condition that the electronic apparatus 200 is in a REC state. For example, the CPU 26 determines that a notification screen is displayed if the electronic apparatus 200 is in a REC state when the power saving mode is invalid and a remaining time is less than a threshold. Further, the CPU 26 determines that the notification screen is not displayed if the electronic apparatus 200 is in a non-REC state when the power saving mode is invalid and a remaining time is less than a threshold.

After step S1204, the CPU 26 performs the same processing as the processing after step S902 in the first embodiment. Note that the CPU 26 may also display a remaining time after the switching of a power mode on the notification screen displayed in step S902 like the first embodiment.

Note that the power saving control processing 1200 in FIG. 12 describes an example in which the CPU 26 changes the threshold of a remaining time depending on whether the electronic apparatus 200 is in a REC state. Besides this, the CPU 26 may change the display mode of a notification screen depending on whether the electronic apparatus 200 is in a recording state. For example, when the power saving mode is invalid and a remaining time is less than a threshold, the CPU 26 determines that notification to prompt the user to switch to the power saving mode is provided regardless of whether functions available in the normal mode but unavailable in the power saving mode are being used. At this time, the display region (the display position and size) of the notification screen may be changed depending on whether the electronic apparatus 200 is in a REC state. For example, when the electronic apparatus 200 is in a REC state, the CPU 26 may display a notification screen to be small at a part of a display unit 11 so that a captured image is easily seen. Further, for example, the CPU 26 may display a notification screen in a pop-up manner when the electronic apparatus 200 is in a REC state. On the other hand, the CPU 26 may display a notification screen to be large at the center of the screen of the display unit 11 when the electronic apparatus 200 is in a non-REC state.

Further, for example, the CPU 26 may change the display content (notification content) of a notification screen depending on whether the electronic apparatus 200 is in a REC state. The notification content refers to, for example, information such as a message for prompting the user to switch to the power saving mode, a remaining time before and after the switching of a power mode, and functions disabled after switching to the power saving mode. When the electronic apparatus 200 is in a REC state, the CPU 26 may display a message for prompting the user to switch to the power saving mode and a remaining time before and after the switching of a power mode on a notification screen. At this time, functions disabled after switching to the power saving mode are not displayed. On the other hand, when the electronic apparatus 200 is in a non-REC state, the CPU 26 may display, in addition to a message for prompting the user to switch to the power saving mode and a remaining time before and after the switching of a power mode, functions disabled after switching to the power saving mode on a notification screen. When the electronic apparatus 200 is in a REC state, the CPU 26 may reduce the amount of displayed information than a case in which the electronic apparatus 200 is in a non-REC state so that a captured image is easily seen. Note that information included in notification may be appropriately combined together depending on the image capturing state of the electronic apparatus 200.

Further, for example, the CPU 26 may change the transparency of a notification screen depending on whether the electronic apparatus 200 is in a REC state. For example, when the power saving mode is invalid and a remaining time is less than a threshold, the CPU 26 determines that notification to prompt the user to switch to the power saving mode is provided regardless of whether functions available in the normal mode but unavailable in the power saving mode are being used. At this time, the transparency of a notification screen in a case in which the electronic apparatus 200 is in a REC state may be higher than that of the notification screen in a case in which the electronic apparatus 200 is in a non-REC state. As described above, the CPU 26 is able to prompt the user to switch to the power saving mode while ensuring the visibility of a REC state by changing the display mode of a notification screen such as a display region, a display content, and transparency.

Further, the CPU 26 may change the number of repetition times of notification depending on whether the electronic apparatus 200 is in a REC state. For example, when the electronic apparatus 200 is in a REC state, the CPU 26 displays a notification screen in a case in which the power saving mode is invalid, a remaining time is less than two minutes (first threshold), and functions available in the normal mode but unavailable in the power saving mode are not being used. On the other hand, when the electronic apparatus 200 is in a non-REC state, the CPU 26 displays the notification screen in a case in which the power saving mode is invalid, a remaining time is less than five minutes (second threshold), and functions available in the normal mode but unavailable in the power saving mode are not being used. Then, if the power mode of the electronic apparatus 200 is not switched to the power saving mode at this point, the CPU 26 may display the notification screen again when the remaining time becomes two minutes. Note that the first threshold and the second threshold are not limited to two minutes or five minutes but other values may be set.

Further, when the electronic apparatus 200 has a plurality of power saving modes, the electronic apparatus 200 is able to extend a remaining time every time its power mode is switched. If the electronic apparatus 200 is in a non-REC state, the CPU 26 provides notification when a remaining time is five minutes. After the extension of the remaining time by the switching of a power mode, the CPU 26 displays the notification screen when the remaining time becomes five minutes again. As described above, the CPU 26 may repeatedly display a notification screen a plurality of times when the electronic apparatus 200 is in a non-REC state.

Note that a timing at which a notification screen is displayed and the number of display times of the notification screen are given as an example. As described above, a notification screen is displayed more frequently in a non-REC state than a REC state. Thus, when the electronic apparatus 200 is not in a non-REC state, the user is allowed to switch to the power saving mode with a time allowance. On the other hand, a notification screen is not repeatedly displayed when the electronic apparatus 200 is in a REC state. Therefore, the user is allowed to concentrate on photographing.

Note that the CPU 26 may perform control so that a notification screen once displayed is not displayed again, or may perform control so that the notification screen is displayed a predetermined number of times set by the user. Further, the CPU 26 may display a different content depending on a displayed timing when a notification screen is displayable a plurality of times.

Note that the CPU 26 may change at least any of a condition for determining whether to provide notification to prompt the user to switch to the power saving mode, the display mode of notification, and the number of display times of notification depending on the image capturing state of the electronic apparatus 200.

Further, when the electronic apparatus 200 has at least three operating modes (power modes) having different power consumption, the CPU 26 may perform a display to prompt the user to validate an operating mode having the lowest power consumption. Note that the CPU 26 may perform a display to switch to an operating mode having power consumption lower than that of a present operating mode by one level, or may display a plurality of alternatives for a power mode having power consumption lower than that of a present operating mode.

Further, the CPU 26 may provide notification to prompt the user to switch an operating mode by a method other than a display. For example, when the electronic apparatus 200 has a voice output/voice recognition function, the CPU 26 may provide notification to the user by voice. In response to notification by voice from the electronic apparatus 200, the user is allowed to perform a switching operation by voice. The user is allowed to switch the operating mode of the electronic apparatus 200 while keeping the visibility of a display screen by receiving notification and performing a switching operation by voice.

As described above, in the second embodiment, the CPU 26 changes a threshold for displaying a notification screen depending on the image capturing state of the electronic apparatus 200 unlike the first embodiment. The electronic apparatus 200 described in the second embodiment displays a notification screen at a timing suiting the image capturing state of the user. Thus, the electronic apparatus 200 is able to provide setting means excellent in convenience.

Note that when determining in step S1204 that the notification to prompt the user to switch to the power saving mode is provided, the electronic apparatus 200 may not provide the notification to the user but may automatically switch to the power saving mode. Further, the electronic apparatus 200 may automatically switch to the power saving mode when the electronic apparatus is in a REC state and may provide a notification to the user when the electronic apparatus 200 is in a non-REC state. Since the electronic apparatus 200 automatically switches to the power saving mode, the user is allowed to extend a remaining time without switching a power mode by himself/herself.

Third Embodiment

In a third embodiment, an electronic apparatus performs control to change or maintain a power mode according to whether a switching condition relating to the switching of the power mode is satisfied. Thus, when the power mode is switched to a power mode having higher power consumption, the electronic apparatus is able to prevent its shutdown immediately after the switching of the power mode due to the shortage of power supplied from a battery.

Figure 5:
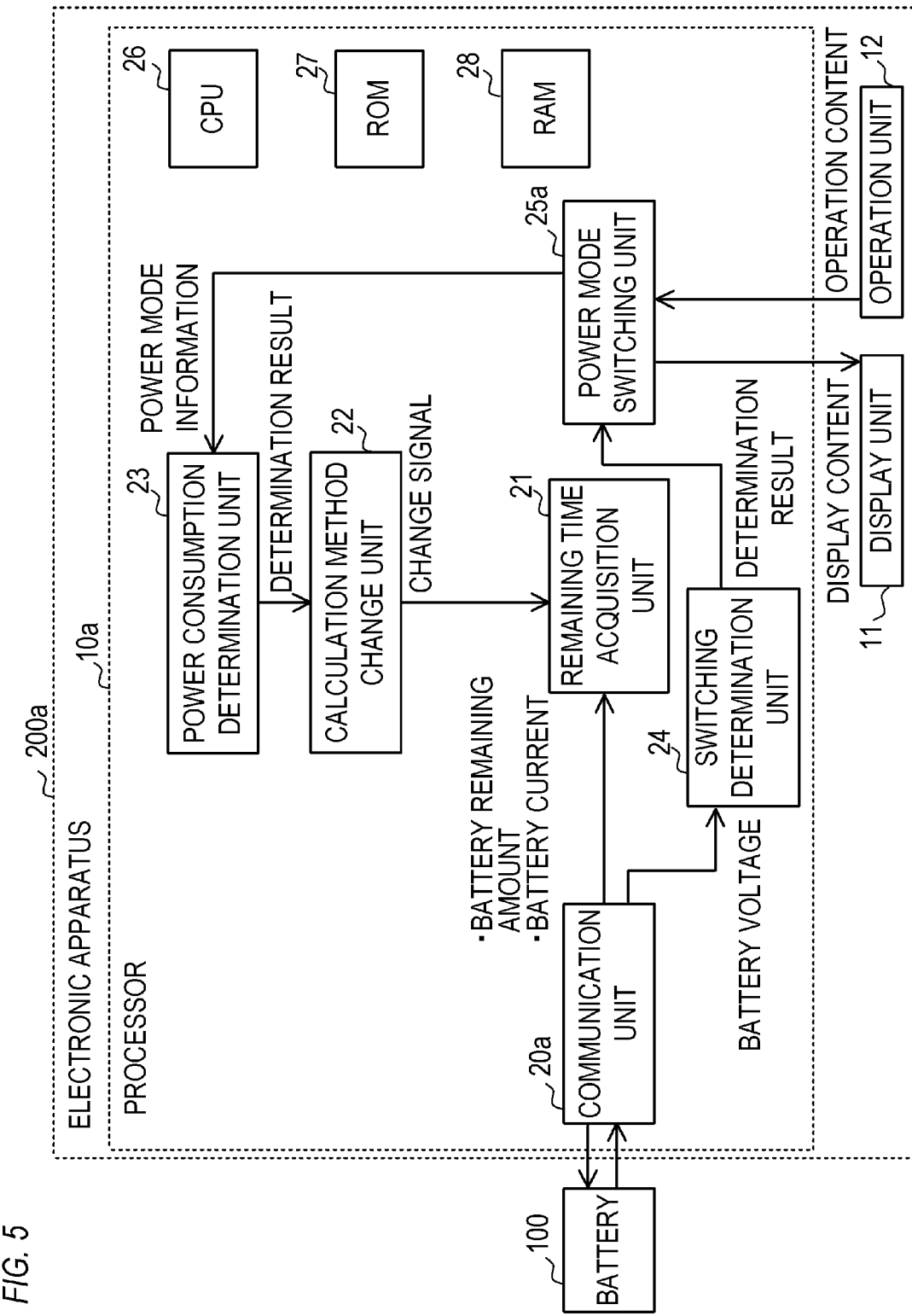
FIG. 5 is a block diagram for describing some of the configurations of an electronic apparatus 200a in a third embodiment.

Some of the configurations of an electronic apparatus 200a in the third embodiment will be described with reference to FIG. 5. Matters that will not be mentioned as the configurations and operations of the third embodiment conform to those of the first embodiment. In the third embodiment, the processor 10, the communication unit 20, and the power mode switching unit 25 in the first embodiment are replaced by a processor 10a, a communication unit 20a, and a power mode switching unit 25a, respectively.

In the third embodiment, the electronic apparatus 200a further has a switching determination unit 24. The switching determination unit 24 determines whether any of the remaining time of the electronic apparatus 200a, the remaining amount of a battery, and a battery voltage satisfies the switching condition for switching to a power mode having power consumption higher than that of a present power mode. On the basis of the determination result of the switching determination unit 24, the power mode switching unit 25a performs control whether to switch a power mode according to instructions to switch to a power mode having power consumption higher than that of a present power mode (for example, from a power saving mode to a normal mode) from a user. When the switching determination unit 24 determines that the switching condition for switching to the normal mode is satisfied, the power mode switching unit 25a performs the switching of the power mode to the normal mode according to the instructions to switch from the power saving mode to the normal mode from the user. When the switching determination unit 24 determines that the switching condition is not satisfied, the power mode switching unit 25a does not perform the switching of the power mode from the power saving mode to the normal mode according to the instructions from the user. When the switching determination unit 24 determines that the switching condition is not satisfied, an operation unit 12 may not receive the instructions to switch from the power saving mode to the normal mode.

Further, the power mode switching unit 25a outputs a display content including information on a power mode to a display unit 11 according to the determination result of the switching determination unit 24. The operation unit 12 outputs an operation content selected and operated by the user to the power mode switching unit 25a. Here, the display unit 11 displays a power mode, which is determined as being not satisfying the switching condition by the switching determination unit 24, as a state that is not selectable through the operation unit 12. Since the operation unit 12 does not receive the selection of the power mode not satisfying the switching condition, the electronic apparatus 200a is able to prevent its shutdown immediately after the switching of the power mode due to the shortage of power supplied from the battery. The power mode switching unit 25a outputs a power mode selected by the user to a power consumption determination unit 23 as power mode information. A remaining time is calculated according to the method described in the first embodiment. A CPU 26 ends the driving of the electronic apparatus 200a on the basis of a remaining time acquired by a remaining time acquisition unit 21. Note that the CPU 26 may end the driving of the electronic apparatus 200a on the basis of a battery remaining amount (reference capacity) or a battery voltage (reference voltage) that is set in advance.

Figure 6:
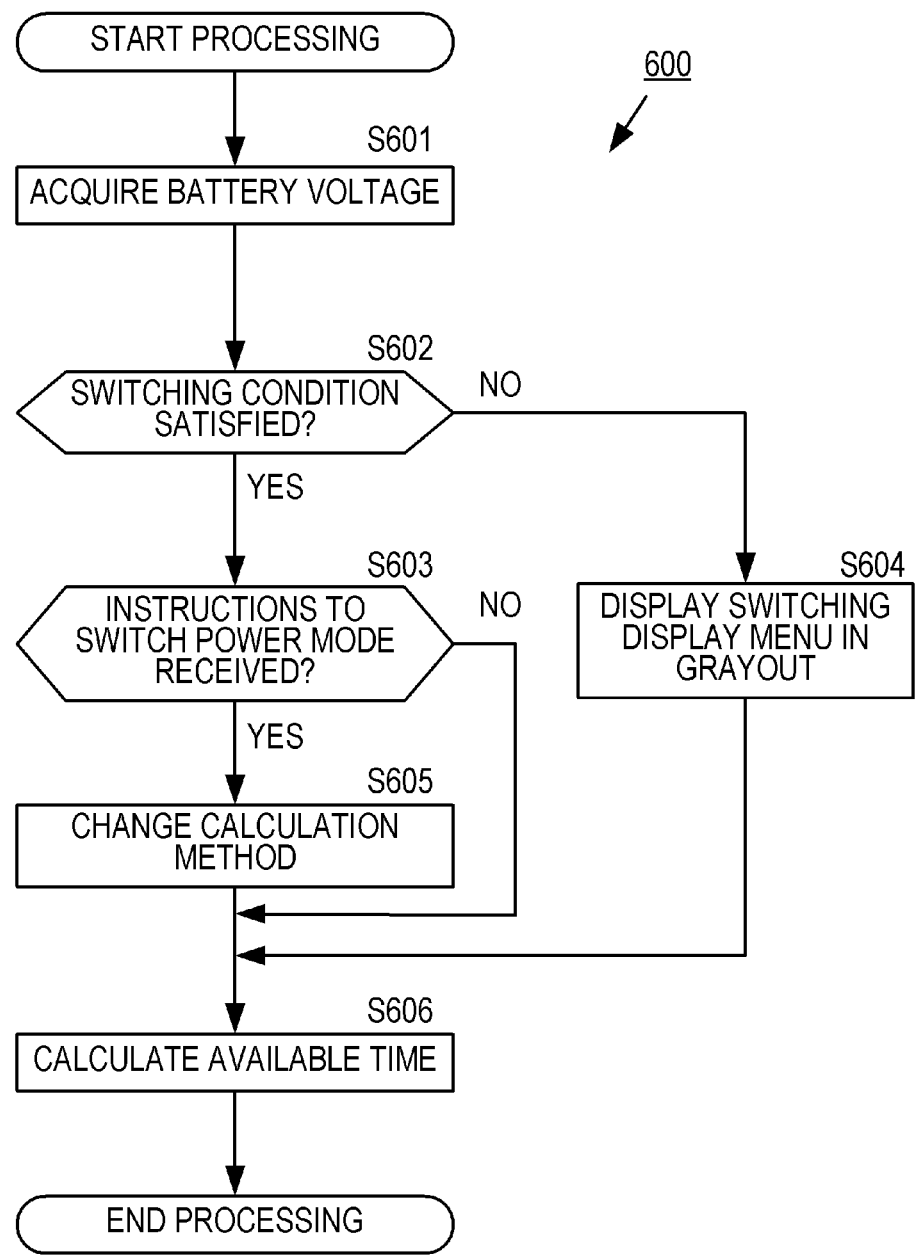
FIG. 6 is a flowchart for describing display switching processing 600 for a power mode.

FIG. 6 is a flowchart describing display switching processing 600 for a power mode. The display switching processing 600 starts when the power supply of the electronic apparatus 200a is turned on.

In step S601, the communication unit 20a acquires a battery voltage from the battery 100. Note that the battery voltage is acquired at, for example, every predetermined interval.

In step S602, the switching determination unit 24 determines whether the battery voltage acquired in step S601 satisfies the switching condition for switching from the power saving mode to the normal mode. Note that the switching determination unit 24 determines that the switching condition is satisfied as for switching from the normal mode to the power saving mode. The processing proceeds to step S603 when the battery voltage satisfies the switching condition for switching to the normal mode. Otherwise, the processing proceeds to step S604.

Figure 7:
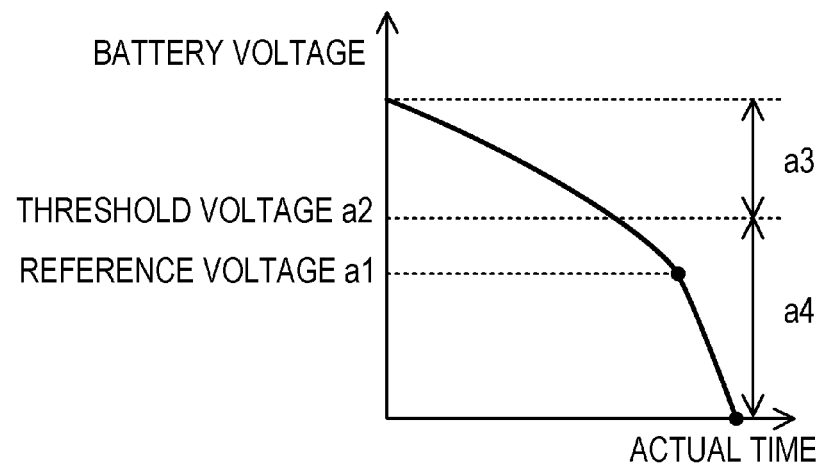
FIG. 7 is a diagram for describing the determination of a power mode switching condition when the electronic apparatus 200a has two power modes.

Here, the switching condition for switching to the normal mode will be described with reference to FIG. 7. The switching condition for switching to the normal mode includes, for example, any of a condition that a battery voltage is at least a threshold voltage, a condition that a battery remaining amount is at least a threshold capacity, and a condition that a remaining time is at least a threshold remaining time. Note that the switching determination unit 24 may combine a plurality of conditions among the three conditions together and determine whether the combined conditions are satisfied. Each of the conditions will be described below.

When the switching condition is the condition that the battery voltage is at least a threshold voltage, the switching determination unit 24 compares the battery voltage acquired by the communication unit 20a with a threshold voltage stored in advance in a ROM 27. The switching determination unit 24 determines that the switching condition is satisfied when the battery voltage is at least the threshold voltage. The switching determination unit 24 determines that the switching condition is not satisfied when the battery voltage is less than the threshold voltage.

The determination of the switching condition based on a battery voltage will be described with reference to FIG. 7. FIG. 7 is a graph showing a change in the battery voltage relative to the actual operating time (actual time) of the electronic apparatus 200a. A vertical axis shows the battery voltage, and a horizontal axis shows the actual time. In the normal mode, the remaining time of the electronic apparatus 200a is calculated so as to become zero when the battery voltage drops to a reference voltage a1. The electronic apparatus 200a ends its driving (shuts down) when the remaining time of the electronic apparatus 200a becomes zero. A threshold voltage a2 is a value different from the value of the reference voltage a1 and set at a value higher than the value of the reference voltage a1. The switching determination unit 24 determines that the switching condition for switching to the normal mode is satisfied when the battery voltage is at least the threshold voltage a2 (falls within the range of a3 in FIG. 7). The switching determination unit 24 determines that the switching condition for switching to the normal mode is not satisfied when the battery voltage is less than the threshold voltage (falls within the range of a4 in FIG. 7).

By setting a value higher than the reference voltage corresponding to the normal mode as the value of the threshold voltage, the following effect is, for example, obtained. If the value of the threshold voltage is set to be the same as the value of the reference voltage corresponding to the normal mode, it is determined that the switching condition for switching from the power saving mode to the normal mode is satisfied in a state in which the battery voltage is equal to the reference voltage. The reference voltage corresponding to the power saving mode is lower than the reference voltage corresponding to the normal mode. Therefore, in the power saving mode, the remaining time does not become zero in a state in which the battery voltage is equal to the reference voltage corresponding to the normal mode.

However, in the power saving mode, the remaining time is calculated as zero when the power saving mode is switched to the normal mode in a state in which the battery voltage is equal to the reference voltage corresponding to the normal mode. Accordingly, the electronic apparatus 200a immediately shuts down at a timing at which the power mode is changed. Therefore, the power mode is switched pointlessly for a user. In view of this, the threshold voltage is only required to be set at a value higher than the value of the reference voltage corresponding to the normal mode. As a result of setting the threshold voltage at a value higher than the value of the reference voltage corresponding to the normal mode, the switching determination unit 24 determines that the switching condition for switching from the power saving mode to the normal mode is not satisfied in a state in which the battery voltage is equal to the reference voltage corresponding to the normal mode. Since the power mode switching unit 25a does not perform the switching of the power mode from the power saving mode to the normal mode according to the instructions from the user, the electronic apparatus 200a is able to prevent its shutdown immediately after the switching to the normal mode due to the shortage of power supplied from the battery.

The threshold voltage may be, for example, one obtained by adding an offset voltage, which is based on the minimum operating time (the time required for the electronic apparatus 200a to operate until the end of its driving) of the electronic apparatus 200a after the power mode is switched to the normal mode, to the reference voltage. More specifically, the offset voltage may be determined on the basis of the operating time of the electronic apparatus 200a before the battery voltage in the normal mode reduces from the threshold voltage to the reference voltage. For example, when the minimum operating time after the power mode is switched from the power saving mode to the normal mode is five minutes, the threshold voltage may be a value obtained by measuring a battery voltage $\Delta V$ that reduces after the electronic apparatus 200a operates for five minutes in the normal mode and then adding the battery voltage $\Delta V$ to the reference voltage corresponding to the normal mode. The minimum operating time may be a value set in advance or a value settable by the user.

When the switching condition is the condition that a battery remaining amount is at least a threshold capacity, the switching determination unit 24 compares a battery remaining amount received from the communication unit 20a with a threshold capacity stored in advance in the ROM 27. The switching determination unit 24 determines that the switching condition for switching to the normal mode is satisfied when the battery remaining amount is at least the threshold capacity. The switching determination unit 24 determines that the switching condition for switching to the normal mode is not satisfied when the battery remaining amount is less than the threshold capacity. The threshold capacity may be a value higher than a reference capacity with which the electronic apparatus 200a performs shutdown processing in the normal mode. The threshold capacity may be, for example, one obtained by adding an offset capacity, which is based on the minimum operating time of the electronic apparatus 200a after the power mode is switched to the normal mode, to the reference capacity. More specifically, the offset capacity may be determined on the basis of the operating time of the electronic apparatus 200a before the battery capacity in the normal mode reduces from the threshold capacity to the reference capacity.

When the switching condition is the condition that a remaining time is at least a threshold remaining time, the switching determination unit 24 compares a remaining time after the power mode is switched to the normal mode with a threshold time stored in advance in the ROM 27. The remaining time is calculated according to the method described in the first embodiment. The switching determination unit 24 determines that the switching condition for switching to the normal mode is satisfied when the remaining time is at least the threshold remaining time. The switching determination unit 24 determines that the switching condition for switching to the normal mode is not satisfied when the remaining time is less than the threshold remaining time. The threshold remaining time may be, for example, a minimum operating time after the switching of the power mode.

In S603 of FIG. 6, the power mode switching unit 25a determines whether instructions to switch a power mode have been received from the user. Specifically, the power mode switching unit 25a determines whether instructions to switch to the normal mode have been received during an operation in the power saving mode. The processing proceeds to step S605 when the power mode switching unit 25a has received the instructions to switch to the normal mode. Otherwise, the processing proceeds to step S606.

In step S604, the display unit 11 displays the normal mode as a state that is not selectable. For example, the display unit 11 displays a power mode switching display menu itself as a state that is not selectable. Note that the display unit 11 may display the normal mode as a state that is not selectable although the power mode switching display menu is selectable. The state that is not selectable is, for example, a state that is displayed but is not selectable, i.e., a state that is displayed in grayout. Note that the display unit 11 may display the switching display menu or the normal mode to the user so as not to be selectable through an icon or the like or may not display the switching display menu or the normal mode other than displaying the same in grayout. Further, for example, when receiving a power mode that is not selectable, the display unit 11 may display a message screen to notify the user of the fact that the power mode is not selectable. Further, for example, the display unit 11 may display the ON and OFF of the power saving mode instead of displaying the alternatives of the normal mode and the power saving mode. When displaying the ON and OFF of the power saving mode, the display unit 11 may display the OFF of the power saving mode as a state that is not selectable according to the determination result of the switching determination unit 24. Note that the display method is not limited to the above methods but is only required to be a display method with which the user is notified of the fact that a change in a power mode having power consumption higher than that of a present power mode is not allowed. Like this, switching to a power mode having higher power consumption is suppressed in a state in which supplied power is short. Thus, the electronic apparatus 200a is able to prevent its immediate shutdown due to the shortage of power supplied from the battery that may occur along with the switching of a power mode.

In step S605, the calculation method change unit 22 changes a calculation method for calculating the remaining time of the electronic apparatus 200a according to the power mode to which the power mode switching unit 25a has been instructed to switch in step S603. The calculation method change unit 22 changes the correction coefficient k used to calculate the remaining time from the value of the power saving mode to the value of the normal mode.

In step S606, the remaining time acquisition unit 21 calculates the remaining time of the electronic apparatus 200a using the calculation method described in the first embodiment. The processing of steps S601 to S606 is repeatedly executed at a predetermined interval during the operation of the electronic apparatus 200a.

Figure 8:
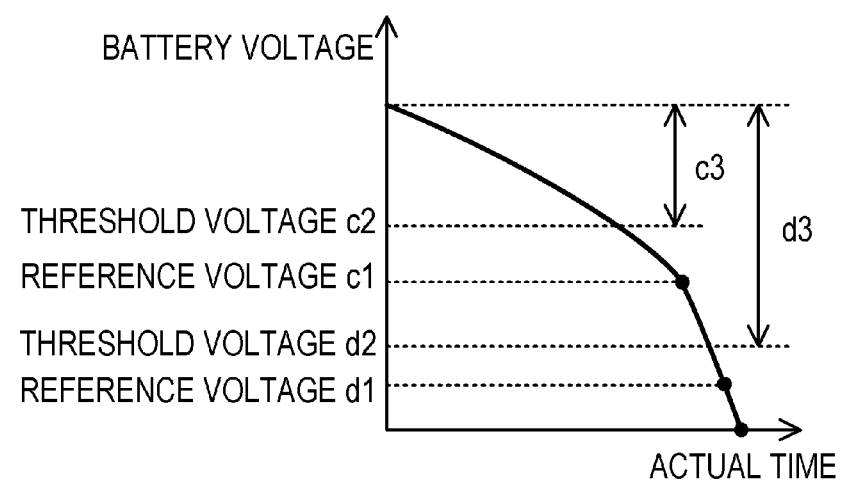
FIG. 8 is a diagram for describing the determination of a power mode switching condition when the electronic apparatus 200a has three power modes.

In FIG. 8, processing when the electronic apparatus 200a has three power modes will be described. In FIG. 7, a case in which the electronic apparatus 200a has the two power modes of the normal mode and the power saving mode is described as an example. However, the above method is also applicable to a case in which the electronic apparatus 200a has at least three power modes. For example, the electronic apparatus 200a has the three power modes of a normal mode, a first power saving mode, and a second power saving mode in descending order of power consumption. In this case, the electronic apparatus 200a performs shutdown processing when its battery voltage drops to a reference voltage c1 in the normal mode, and performs the shutdown processing when the battery voltage drops to a reference voltage d1 in the first power saving mode.

The switching determination unit 24 compares the battery voltage with a threshold voltage c2 and determines whether a condition for switching from the first power saving mode or the second power saving mode to the normal mode is satisfied. Further, the switching determination unit 24 compares the battery voltage with a threshold voltage d2 and determines whether a condition for switching from the second power saving mode to the first power saving mode is satisfied. The switching determination unit 24 determines that the condition for switching from the first power saving mode or the second power saving mode to the normal mode is satisfied when the battery voltage is at least a threshold voltage c2 (falls withing the range of c3 in FIG. 8). The switching determination unit 24 determines that the condition for switching from the second power saving mode to the first power saving mode is satisfied when the battery voltage is at least a threshold voltage d2 (falls withing the range of d3 in FIG. 8). The power mode switching unit 25a outputs a display content to the display unit 11 so that a power mode, which is determined as being not satisfying the switching condition for switching the power mode by the switching determination unit 24, is displayed as a state that is not selectable through, for example, a grayout display or the like. When the electronic apparatus 200a has at least the three power modes as described above, the electronic apparatus 200a is able to prevent its shutdown immediately after the switching of the power modes. Note that even when the electronic apparatus 200a has at least the three power modes, a condition used by the switching determination unit 24 to make a determination is not limited to the comparison of a battery voltage but may include other conditions such as the comparison of a battery remaining amount and the comparison of the remaining time of the electronic apparatus 200a like the case in which the electronic apparatus 200a has the two power modes. Note that when the electronic apparatus 200a has at least the three power modes, the switching determination unit 24 is able to determine that a condition for switching is satisfied as for switching from the normal mode to the first power saving mode or the second power saving mode and switching from the first power saving mode to the second power saving mode.

According to the third embodiment, the electronic apparatus 200a is able to prevent its shutdown immediately after the switching of a power mode due to the shortage of power supplied from the battery.

Fourth Embodiment

At least one of the various functions, processing, and methods described in the above embodiment may be realized when a personal computer, a micro computer, a CPU, or a micro processor executes a program. Hereinafter, a personal computer, a micro computer, a CPU, or a micro processor will be called a "computer X" in a fourth embodiment. In the fourth embodiment, a program for controlling the computer X and realizing at least one of the various functions, processing, and methods described in the above embodiments will be called a "program Y".

At least one of the various functions, processing, and methods described in the above embodiments is realized when the computer X executes the program Y. In this case, the program Y is supplied to the computer X via a computer-readable storage medium. The computer-readable storage medium in the fourth embodiment includes at least one of a hard disk device, a magnetic storage device, an optical storage device, a magneto-optical storage device, a memory card, a volatile memory, and a non-volatile memory. The computer-readable storage medium in the fourth embodiment is a non-transitory storage medium.

According to the present disclosure, the available time of an electronic apparatus is extendable.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-126028, filed on Jul. 30, 2021, which is hereby incorporated by reference herein in its entirety.

What is claimed is:

1. An electronic apparatus comprising:
at least one processor; and
at least one memory storing a program which, when executed by the at least one processor, causes the electronic apparatus to function as:
an acquisition unit configured to acquire information on a remaining time representing a remaining usable time of the electronic apparatus;
a control unit configured to perform control to set any of a plurality of modes including a first mode and a second mode having power consumption of the electronic apparatus that is lower than power consumption of the electronic apparatus in the first mode, and
a recording unit configured to record a captured image,
wherein the control unit performs processing to provide notification to prompt a user to switch from the first mode to the second mode in a case where the remaining time corresponding to the information acquired by the acquisition unit is less than a threshold and a predetermined condition for switching from the first mode to the second mode is satisfied in the first mode, and
wherein the control unit performs processing for the notification depending on whether the electronic apparatus is in a recording state so that in a case where the recording unit is in the recording state of the image, the notification is provided in a case where the remaining time is less than a first threshold and the predetermined condition is satisfied in the first mode, and in a case where the recording unit is not in the recording state of the image, the notification is provided in a case where the remaining time is less than a second threshold larger than the first threshold and the predetermined condition is satisfied in the first mode.

* * * * *